April 2, 1968  J. LAWRENCE  3,376,121
COMPOSITE BODY AND METHOD OF MAKING
Filed July 15, 1964
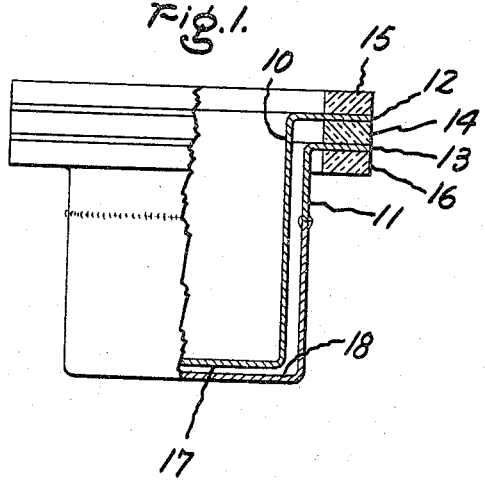
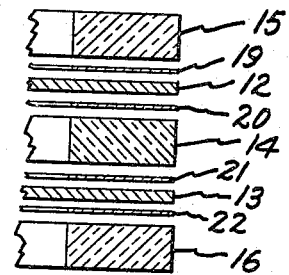
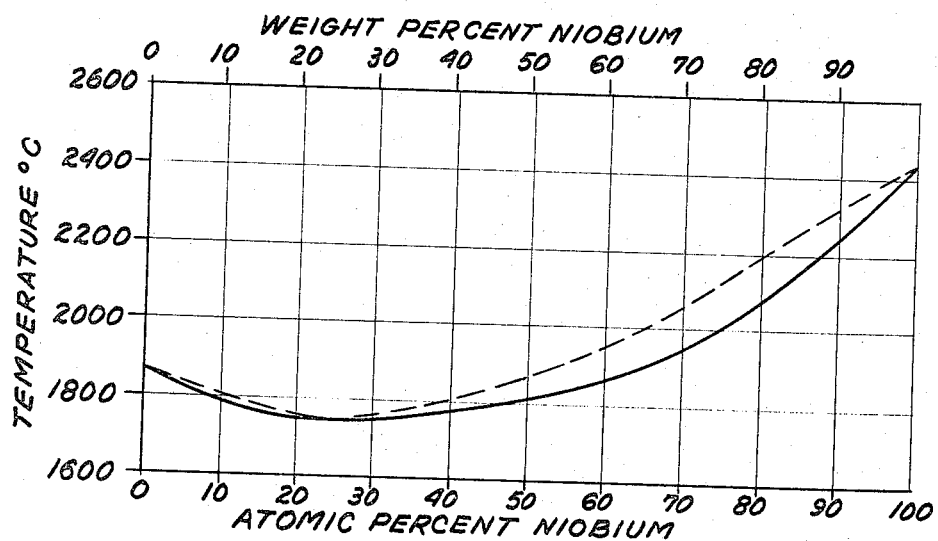
Inventor:
Jackson Lawrence,
by Richard R. Brainard
His Attorney.

United States Patent Office 3,376,121
Patented Apr. 2, 1968

3,376,121
COMPOSITE BODY AND METHOD
OF MAKING
Jackson Lawrence, West Sand Lake, N.Y., assignor to
General Electric Company, a corporation of New
York
Filed July 15, 1964, Ser. No. 382,722
3 Claims. (Cl. 29—195)

The present invention relates to composite bodies and an improved method of making such bodies. More particularly, the invention relates to making an hermetic seal between a metal member and a non-metallic refractory member such as a ceramic.

The art of joining materials together, including ceramic-to-ceramic or ceramic-to-metal bond, is highly developed. However, composite body structures and methods of making them which are suitable for high temperature applications are few and, in fact, difficulty is experienced in finding suitable bonds for fabricating envelopes of high temperature devices, particularly devices operating with a vacuum or controlled gaseous atmosphere enclosed within the envelope, such as required for thermionic converters, for example. In addition, where these converters are to be nuclear fueled it is desirable that the materials involved have a low neutron cross section so thaat they will not be unduly heated by neutron absorption when the device is operated.

Accordingly, it is an important object of the present invention to provide an improved composite body and method of making which is particularly suited for fabricating hermetically sealed high temperature vacuum or gas filled devices.

It is a further and more specific object of my invention to provide an improved composite body and method of making particularly suited to the fabrication of devices subjected to neutron irradiation. Further objects and advantages of my invention will become apparent as the following description proceeds, reference being had to the accompanying drawing in which:

FIG. 1 is an elevational view, partially in section, illustrating schematically a thermionic converter embodying my invention;

FIG. 2 is an enlarged elevational view showing the members to be sealed in assembled but exploded relation prior to sealing; and FIG. 3 is a portion of a phase diagram of niobium-zirconium showing a curve of melting temperature versus alloy composition.

In the drawing I have shown my invention applied to the hermetic sealing together of the electrodes of a thermionic converter. These converters include as essential elements an electron emitting surface and an electron collection surface, these surfaces being mutually insulated in the envelope structure and supported in closely spaced and opposed relation. Typically, the interior of the envelope is filled with a gaseous medium such as cesium vapor. Since the particular structure and operation of the converter are not part of the present invention, the illustration has been somewhat simplified and may be considered a schematic showing only. These devices may include metal parts connected to the emitter and collector electrodes which extend in opposed relation and are hermetically sealed together in electrically insulated relation. In FIG. 1 of the drawing, these parts include generally cup-shaped metal members 10 and 11 provided with outwardly extending peripheral flanges 12 and 13 which are separated and mutually insulated by an interposed ceramic ring 14. Backing rings of ceramic material 15 and 16 are bonded to the outer surfaces of the flanges 12 and 13. In accordance with an important aspect of the present invention, at least the metal flanges 12 and 13 to be bonded are of niobium and are bonded to the ceramic rings 14, 15 and 16 by a niobium-zirconium alloy formed in place as will be described in more detail at a later point in the specification. The cup-shaped member 10 provides the collector surface 17 and the cup-shaped member 11 provides the emitter surface 18, which may, to advantage, be of rhenium. To this end the member 11 may be a composite body fabricated by electron beam welding the niobium flange portion 13 to the rhenium emitter portion 18. The ceramic members are preferably alumina bodies which match in temperature expansion characteristics of niobium and may to advantage be a high density transparent alumina body sold under the name Lucalox and described and claimed in Coble Patent No. 3,026,210, granted Mar. 20, 1962.

The manner in which the bond is made in accordance with the present invention will be more apparent from a brief consideration of the enlarged view of FIG. 2 showing the ceramic insulating members 14, 15 and 16 in assembled relation with respect to the outwardly extending flanges 12 and 13 of niobium and with interposed shims 19, 20, 21 and 22 of zirconium. As indicated in FIG. 3, the zirconium-niobium alloy having the lowest melting temperature is about 22 percent by weight niobium with a melting temperature of 1740° C. As is also apparent, the melting point changes very slowly in the vicinity of this percentage niobium and is only slightly higher in the range of 5 to 50 percent. Preferably the amount of zirconium provided is relatively small since it is an active metal and reacts with the ceramic. The shim, for example, may be 0.3 mil thick. In making the seal the parts to be joined together are assembled in stacked relation as shown in FIG. 2 and are biased toward one another either by a weight or by spring loading. The assembly is preferably enclosed in a vacuum enclosure such as a bell jar and the parts heated, as by high frequency induction heating, either in a high vacuum or in the presence of gas which is inert with respect to the material heated, such as argon. The temperature is raised to something above 1740° C., and preferably only slightly above that temperature, to provide melting at the zirconium-niobium interface and the formation of the alloy. As will be readily appreciated, there is some diffusion of the zirconium into the niobium so that there is a somewhat graded composition away from the interface. Also, as will be readily appreciated, the actual temperature may be adjusted by observing the seal as it is being made. As the temperature reaches 1740° C., liquid will start to form right at the niobium-zirconium interface. The appearance of the liquid phase is actually the best criterion for determining the heating required, and the heating is terminated very shortly after the first appearance of the liquid phase. The length of heating time is determiner by the mass and configuration of the parts, the rate of supplying heating energy and the like.

The niobium expansion with temperature matches rather closely the expansion of the alumina ceramics. Also, the niobium-zirconium has a low vapor pressure at elevated temperatures, say of the order of 1200–1400° C., and both the alumina and niobium have small neutron cross sections so they are well suited to use in nuclear fueled thermionic converters, for example, as they do not tend to absorb neutron radiation and become excessively heated.

While I have shown and described several embodiments of my invention, it will be apparent to those skilled in the art that many changes and modifications may be made without departing from my invention in its aspects; and I therefore intend the appended claims to cover all such changes and modifications as fall within the true spirit and scope of my invention.

What I claim as new and desire to secure by Letters Patent of the United States is:

1. A composite body comprising a niobium member, an alumina member and a bonding interface between said members consisting essentially of the interaction products of the alumina member and a zirconium-niobium eutectic.

2. The method of bonding a niobium member to a ceramic member which comprises placing said members with surfaces thereof in opposed relation, interposing a zirconium member between said surfaces, biasing said members toward one another and heating said members to a temperature above 1740° C., to produce melting at the niobium-zirconium interface and allowing the members to cool to bond said members together.

3. The method of bonding a niobium member to an alumina member which comprises placiing said members with surfaces thereof in opposed relation, interposing a zirconium member between said surfaces, biasing said members toward one another and heating said members to a temperature above 1740° C. to produce melting at the niobium-zirconium interface and allowing the members to cool to bond said members together.

References Cited

UNITED STATES PATENTS

| | | | |
|---|---|---|---|
| 2,686,958 | 8/1954 | Eber | 29—473.1 |
| 2,775,531 | 12/1956 | Montgomery. | |
| 2,857,663 | 10/1958 | Beggs | 29—473.1 |
| 3,214,833 | 11/1965 | Erickson | 29—195 |

HYLAND BIZOT, *Primary Examiner.*